United States Patent
Suzuki et al.

(10) Patent No.: US 6,413,672 B1
(45) Date of Patent: Jul. 2, 2002

(54) LITHIUM SECONDARY CELL AND METHOD FOR MANUFACTURING THE SAME

(75) Inventors: Atsushi Suzuki; Kuniyuki Nakanishi; Ryuichi Tsuji; Toru Nishimura, all of Wakayama (JP); Tetsuya Kusakabe, deceased, late of Wakayama; by Miharu Kuskabe, legal representative, Inchinomiya; by Hatsuo Kusakabe, legal representative; by Hideko Kusakabe, legal representative, both of Nisshin, all of (JP); Fumihide Shiga; Nobuyuki Isshiki, both of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/600,176

(22) PCT Filed: Dec. 2, 1999

(86) PCT No.: PCT/JP99/06776

§ 371 (c)(1),
(2), (4) Date: Sep. 25, 2000

(87) PCT Pub. No.: WO00/33404

PCT Pub. Date: Jun. 8, 2000

(30) Foreign Application Priority Data

Dec. 3, 1998 (JP) .......................................... 10-361913
Feb. 26, 1999 (JP) .......................................... 11-050293
Feb. 26, 1999 (JP) .......................................... 11-050644
Jun. 23, 1999 (JP) .......................................... 11-176606

(51) Int. Cl.$^7$ ............................................ H01M 10/24

(52) U.S. Cl. ................................. 429/231.95; 429/231.8
(58) Field of Search ........................... 429/218.1, 231.8, 429/231.95; 252/502; 423/414

(56) References Cited

U.S. PATENT DOCUMENTS

| 5,340,670 | A | * | 8/1994 | Takami et al. | ............ 429/218.1 |
| 6,090,505 | A | * | 7/2000 | Shimamura et al. | ...... 429/218.1 |
| 6,117,591 | A | * | 9/2000 | Takeuchi et al. | ........ 429/231.95 |
| 6,171,725 | B1 | * | 1/2001 | Suzuki et al. | ............ 429/218.1 |

FOREIGN PATENT DOCUMENTS

| JP | WO-9824135 A1 | * | 6/1998 | ............ H01M/4/58 |
| JP | 11-97014 | | 4/1999 | |
| JP | 2948205 | | 7/1999 | |

* cited by examiner

Primary Examiner—Gabrielle Brouillette
Assistant Examiner—M. Wills
(74) Attorney, Agent, or Firm—Oblon, Spivak, McClelland, Maier & Neustadt, P.C.

(57) ABSTRACT

The present invention relates to a lithium secondary battery with a cathode and an anode, each electrode containing an active material capable of incorporating and releasing lithium ions. The anode includes a sintered material which contains 50 to 99 % by weight of silicon and 1 to 50% by weight of carbon material, and has an electrical conductivity not less than 1 S/cm. By employing the anode including the sintered material containing silicon as the anode active material and carbon material, an increased packing density of the active material and an increased capacity per volume can be obtained. Furthermore, the anode conductivity of not less than 1S/cm can provide a high capacity and improved cycle property.

17 Claims, No Drawings

LITHIUM SECONDARY CELL AND METHOD FOR MANUFACTURING THE SAME

This application is a 371 of PCT/JP99/06776 filed Dec. 2, 1999, now WO00/33404 issued Aug. 6, 2000.

BACKGROUND OF THE INVENTION

1. Field of the Invention

The present invention relates to a lithium secondary battery comprising an anode of a sintered material that contains silicon as an active material, and a method of producing the same.

2. Description of the Related Art

As portable electronic apparatuses such as video cameras and cellular phones become popular, high-energy density lithium secondary batteries have attracted special interest. The lithium secondary battery comprises a cathode and an anode that contain active materials capable of incorporating and releasing lithium ions, and a lithium ion conductive electrolytic solution.

Such attempts have been made as silicon or a compound thereof capable of providing greater capacity per unit volume than carbonaceous materials is used as the anode active material of the lithium secondary battery thereby forming the anode. For example, Japanese Laid-Open Patent Publication No. 7-29602 discloses a method of producing a anode by using $Li_xSi$ ($0 \leqq x \leqq 5$) as the anode active material and molding the anode active material with graphite used as an electrically conducting filler and a binder added thereto into pellets.

Silicon is capable of incorporating a greater amount of lithium than the conventionally used carbonaceous materials. However, electrical resistance of a anode that contains silicon increases since volume thereof changes significantly as charging and discharging operations are repeated, and the capacity of the battery decreases with the number of charge and discharge cycles that have been experienced. Since silicon has lower electrical conductivity than the carbonaceous material, it is necessary to add a large amount of carbonaceous material as electrically conducting filler in order to ensure the electrical conductivity of the anode. As a result, there has been such a problem that the capacity of the battery per unit volume decreases.

There has also been such a problem that a battery having silicon-based anode falls in the state of over-discharge when having been left without charging after discharge, and this causes the dissolution of silicon from the anode or dissolution of copper from a current collector thus resulting in decreased battery capacity.

Fluorine-containing lithium salt having high electrical conductivity has been used in the prior art for the electrolyte contained in a non-aqueous electrolytic solution. However, the electrolytic solution contains hydrogen fluoride. Hydrogen fluoride is produced through reaction of the fluorine-containing lithium salt and moisture that inevitably contaminates the electrolytic solution. Hydrogen fluoride is also likely to contaminate as an impurity during the production process. There has also been such a problem that hydrogen fluoride contained in the electrolytic solution reacts with silicon contained in the anode thus decreasing the amount of active material and decreasing the conductivity of the electrolytic solution, thus degrading the charge-discharge cycle property.

To incorporate lithium into the silicon-based anode, for example, such a method is employed as lithium is supplied from the cathode to the anode by charging. Since silicon particles lose crystallinity and changes to an amorphous structure on the first charging, reversible incorporation and release of lithium ions is made possible. However, there has been such a problem that, although the silicon-based anode can incorporate a large amount of lithium, there is a significant difference between the amount of lithium incorporated and the amount of lithium released (irreversible capacity) at the first charging, and satisfactory cycle property cannot be obtained.

SUMMARY OF THE INVENTION

It is an object of the present invention to provide a lithium secondary battery having high capacity and good cycle property by improving the electrical conductivity of the anode.

It is another object of the present invention to provide a lithium secondary battery having good storage stability, high capacity and good cycle property by suppressing the dissolution of silicon from the anode and copper from the current collector at a time of over-discharge.

It is still another object of the present invention to provide a lithium secondary battery having high capacity and good cycle property by restricting the amount of hydrogen fluoride contained in the electrolytic solution within a predetermined level.

It is still another object of the present invention to provide a lithium secondary battery having high capacity and good cycle property by decreasing the irreversible capacity.

It is still another object of the present invention to provide a method of producing the lithium secondary battery having high capacity and good cycle property.

According to an aspect of the present invention, there is provided a lithium secondary battery with a cathode and an anode, each electrode containing an active material capable of incorporating and releasing lithium ions, said anode comprises a sintered material which contains, at least, 50 to 99% by weight of silicon and 1 to 50% by weight of a carbonaceous material, and the sintered material has an electrical conductivity not less than 1 S/cm.

According to the present invention, since the anode is made from a sintered material that contains an anode active material consisting of 50 to 99% by weight of silicon and 1 to 50% by weight of the carbonaceous material, the packing density of the anode active material can be increased and the battery capacity per unit volume can be increased. The electrical conductivity of the anode having 1 S/cm or higher makes it possible to provide a battery of high capacity and good cycle property.

It is preferable that silicon contained in the sintered material exists in the form of particles and the particles are covered with the carbonaceous material. The carbonaceous material that covers the silicon particles prevents the silicon particles from making direct contact with the electrolytic solution. This makes it possible to suppress the irreversible reaction of the silicon particles and the electrolytic solution even in the state of over-discharge, suppress the decrease of the battery capacity even during storage and maintain high capacity over a longer period of storage time.

According to another aspect of the present invention, there is provided a lithium secondary battery, the anode is made from the sintered material that contains 50 to 99% by weight of silicon and 1 to 50% by weight of carbonaceous material. The sintered material containing high proportion of silicon provides a high capacity.

According to another aspect of the present invention, there is provided a lithium secondary battery with a cathode and an anode, each electrode containing an active material capable of incorporating and releasing lithium ions, said anode is made from the sintered material that contains 50 to 99% by weight of silicon and 1 to 50% by weight of a carbonaceous material, and lithium is incorporated to a degree equivalent to a capacity of 200 to 800 mAh per 1 g of silicon when fully charged. In a battery capable of incorporating lithium in the anode active material equivalent to 200 to 800 mAh when fully charged, irreversible capacity can be decreased and the cycle property can be improved. In the range described above, it is assumed that decay of the crystal structure of silicon and formation of material that do not participate in the charging and discharging reactions, which are considered to cause the irreversible capacity, are suppressed.

According to another aspect of the present invention, there is provided a lithium secondary battery with a cathode, an anode and a lithium conductive electrolytic solution, each electrode containing an active material capable of incorporating and releasing lithium ions, said anode is made from the sintered material that contains 50 to 99% by weight of silicon and 1 to 50% by weight of a carbonaceous material, and said electrolytic solution contains fluorine-containing lithium salt and hydrogen fluoride with the concentration of not ore than 250 $\mu$g/g. Hydrogen fluoride decreases the battery capacity. However, when the concentration of hydrogen fluoride in the electrolytic solution is lowered into the concentration range of not more than 250 $\mu$g/g, decreases in the battery capacity and in the electrical conductivity of the electrolytic solution can be suppressed, and the cycle property can be improved.

Also according to the present invention, such an amount of lithium can be incorporated in the anode when fully charged that is equivalent to 200 to 800 mAh per 1 g of silicon. Capacity not more than 200 mAh is not enough for practical use, and capacity higher than 800 mAh leads to excessive irreversible capacity. The lithium secondary battery having high capacity and good cycle property can be obtained even when the capacity is limited within 800 mAh.

According to another aspect of the present invention, there is provided a process for producing a lithium secondary battery with a cathode and an anode, each electrode containing an active materials capable of incorporating and releasing lithium ions, the step of forming the anode comprises at least a step of forming a coated film consisting of silicon and a binder that forms hard (non-graphitizable) carbon through heat treatment on the current collector and a step of sintering the coated film in a non-oxidizing atmosphere, so that a sintered material of the coated film is integrated with the current collector in the sintering step. The binder of non-graphitizable carbon is added for the purpose of forming amorphous carbon that undergoes less volume change during the heat treatment, thereby making it possible to sinter the coated film while maintaining the shape thereof. As a result, a porous sintered material capable of making sufficient contact with the electrolytic solution can be formed thereby increasing the capacity. Also because the amorphous carbon forms an electrically conductive network in the sintered material, the electrical conductivity of the sintered material is improved. Moreover, since the binder is carbonized to form a solid phase in such a state as the current collector and the coated film are in close contact with each other, adhesion between the current collector and the sintered material is improved and the contact resistance between the current collector and the sintered material is decreased, thereby improving the battery capacity and the cycle property.

The hard carbon refers to a carbon material that is difficult to form a three-dimensional graphite structure even when subjected to a heat treatment at a temperature higher than 3000° C. Those that are carbonized via a liquid-like hydrocarbon such as pitch coke are soft (graphitizable) carbons, and polymers having a three-dimensional structure such as phenol-formaldehyde resin and a wooden material that are carbonized without melting are hard carbons.

Whether a material becomes a hard carbon or a soft carbon is basically determined by the nature of the raw material. A layer-structure made by carbonization at a temperature below about 500° C. is basically maintained through a heat treatment at higher temperatures, and shows clear distinction in terms of parameters of X-ray diffraction only after the heat treatment at a temperature of about 2000° C. In other words, the material subjected to the heat treatment at a temperature of about 2000° C. can be determined whether it is a hard carbon or a soft carbon.

The binder may be at least one selected from the group consisting of phenol-formaldehyde resin, xylene resin, furan resin, vinylidene resin, saccharides, polyacrylonitrile and gelatin.

The retention of the binder after the sintering is preferably not lower than 5% by weight, more preferably 10% by weight or higher. When the retention is 5% by weight or higher, contact resistance between the sintered material and the current collector can be decreased. The retention is represented by the ratio of the weight after heat treatment to the weight before heat treatment determined by thermogravimetry.

DESCRIPTION OF THE PREFERRED EMBODIMENTS

This application is based on Japanese Patent Applications of No. 10-361913 filed Dec. 3, 1998. No. 11-50293 filed Feb. 22, 1999. No. 11-50644 filed Feb. 26, 1999 and No. 11-176606 filed June 23, the content of which are incorporated hereinto by reference.

The lithium secondary battery of the present invention comprises a stacking product containing a cathode current collector, a cathode, a separator containing a non-aqueous electrolytic solution or a polymer electrolyte, an anode and an anode current collector.

The anode used in the present invention contains silicon as the anode active material. Silicon as the anode active material may be either crystalline or amorphous substance of simple silicon, and also may be a silicon compound that can be decomposed or reduced into silicon by heat treatment in a non-oxidizing atmosphere. The silicon compound may be an inorganic silicon compound such as silicon oxide or an organic silicon compound such as silicone resin or silicon-containing polymer compound. Among these, simple substance of silicon is particularly preferable.

As the anode used in the present invention, a sintered material that contains silicon and carbonaceous material is used. The sintered material is formed by, for example, sintering silicon powder in a non-oxidizing atmosphere in the presence of a carbonaceous material or a material that is converted into the carbonaceous material by a heat treatment in such a range of temperatures in which silicon compounds such as SiC are not formed and silicon is not molten. The sintering process is carried out for a period of 0.1 hours or longer at a temperature in a range from 400 to 1400° C., more preferably from 800 to 1200° C., thereby to obtain the sintered material that contains silicon and carbonaceous material. Silicon content in the sintered material is preferably from 50 to 99% by weight. When the silicon content is 50% by weight or more, practically sufficient capacity can be achieved and conductivity of the sintered material not lower than 1 S/cm, more preferably not lower than 10 S/cm can be achieved. More preferably, the silicon content is set to 70% by weight or more which makes it possible to increase the capacity without decreasing the conductivity.

While there is no limitation to the particle size of the silicon powder, powder of mean particle size in a range from 0.5 $\mu$m to 100 $\mu$m may be used for the purpose of decreasing the contact area with the electrolytic solution and for the reason of operability, material cost and uniformity of the powder.

The carbonaceous material used for making the anode of the present invention may be graphite, amorphous carbon or a mixture thereof. For example, coke, natural graphite, artificial graphite, carbonized pitch or a mixture thereof may be used. Also a carbonaceous material obtained by thermal decomposition of an organic material is used.

While the electrically conductive metal used in the current collector of the anode may be a metal selected from among stainless steel, the metals of copper group and the metals of platinum group, copper is preferable for its high conductivity and low cost. The electrically conductive metal may be used in the form of either foil or mesh, thickness is preferably in a range from 3 to 100 $\mu$m.

The cathode used in the present invention may be made of any known material such as $Li_xCoO_2$, $Li_xNiO_2$, $MnO_2$, $Li_xMnO_2$, $Li_xMn_2O_4$, $Li_xMn_{2-y}O_4$, $\alpha$-$V_2O_5$ and $TiS_2$, while a lithium-containing metal oxide that contains a metal selected from a group consisting of cobalt, manganese and nickel is preferable.

As the non-aqueous electrolyte used in the present invention, a nonaqueous electrolyte made by dissolving lithium compound in an organic solvent may be used. A solid electrolyte prepared by incorporating a polymer with a lithium compound in a solid state, or a polymer solid electrolyte prepared by dissolving a lithium compound in an organic solvent and supporting the organic solvent may be used. While using an organic solvent in combination with an electrolyte makes the non-aqueous electrolyte, any of organic solvents and electrolytes that are used in this type of battery may be used. Decreases in the capacity of the battery and in the conductivity of the electrolytic solution can be suppressed and the cycle property can be improved by limiting the concentration of hydrogen fluoride contained in the electrolytic solution not more than 500 $\mu$g/g, preferably not more than 250 $\mu$g/g, and more preferably not more than 150 $\mu$g/g. Decreasing the amount of hydrogen fluoride contaminated as an impurity in the fluorine-containing lithium salt and decreasing the water content in the solvent can restrict the concentration of hydrogen fluoride contained in the electrolytic solution. Water in the solvent does not react with silicon of the anode active material, unlike the case of using the lithium metal as the anode active material. Therefore, the water content in the solvent may be restricted so that the concentration of hydrogen fluoride contained in the electrolytic solution falls within a predetermined range.

Incorporation of lithium into the anode active material is carried out for the battery assembled with the anode, the cathode and the electrolytic solution. That is, the first charging is done to have lithium incorporated until such a predetermined charging capacity is reached that is set in accordance to the amount of the cathode active material that supplies lithium within a range from 200 to 800 mAh, preferably 400 to 800 mAh per 1g of silicon. Then the second and subsequent charging operations are preferably done by setting the value of charging capacity less than that of the first charging.

The "binder that forms the non-graphitizable carbon through the heat treatment, used in the present invention" includes, for example, thermosetting resins such as phenol-formaldehyde resin, xylene resin, furan resin, urethane resin, epoxy resin, polyimide resin, melamine resin and urea resin; saccharides such as sugar, starch and cellulose derivatives; vinylidene resins such as polyvinylidene chloride and polyvinylidene fluoride resin; protein derivative such as gelatin and natural protein; and polyacrylonitrile. Among these, phenol-formaldehyde resin, xylene resin, furan resin, vinylidene resins, saccharides, polyacrylonitrile and gelatin are particularly preferable. The material that becomes the hard carbon through the heat treatment is the binder referred to in the present invention, in case it is contained in the coated film.

In addition to the binder, pitch or the like that becomes the soft carbon through the heat treatment may be used and the degree of carbonization is increased by raising the heat treatment temperature, thereby increasing the conductivity of the sintered material, or graphite or the like may be added thereby increasing the conductivity of the sintered material.

Also a resin or the like that decomposes or volatilizes through heat treatment such as polyvinyl butyral resin may be added. This increases the porosity of the sintered material so that more electrolytic solution can penetrate into the electrode, thereby reducing the internal resistance of the electrode and soften the coated film prior to the heat treatment, thus making it easier to handle the coated film.

It is preferable that the sintered material does not substantially contain SiC that does not incorporate and release lithium ions thereby having no capacity. The expression of not substantially containing SiC means that, as the present inventors discloses in Japanese Patent No. 2948206, peak intensities of wave numbers 770 $cm^{-1}$ and 940 $cm^{-1}$ that are attributed to SiC in Raman spectroscopy are not higher than 0.01 with respect to the peak intensity of wave number 525 $cm^{-1}$ that is attributed to Si. When the value is 0.01 or less, the sintered material does not substantially contain SiC, so that high capacity and good cycle property can be obtained. Formation of a silicon compound such as SiC can be confirmed by observing a color of the sintered material changing to gray.

The method of producing the anode includes at least the preparation of the coating solution by adding silicon powder and a carbonaceous material or an organic material that turns to carbonaceous material through the heat treatment to an solvent, application of the coating solution on the current collector made of an electrically conductive metal, formation of the coated film by drying to remove the solvent, and sintering the coated film, while the current collector may be integrated with the sintered material. The sintered material has a structure such as dispersed phase of silicon exists in the continuous phase of the carbonaceous material, and silicon particles are covered by the carbonaceous material. In case the film that contains the powder is formed on the current collector and is sintered in a non-oxidizing atmosphere to make the anode, the sintering temperature is preferably in such a range as formation of silicon compound such as SiC is suppressed and silicon is not molten. Specifically, the temperature is preferably 1400° C. or lower and not higher than the melting point of the current collector to suppress the reaction of silicon and the current collector. In case copper is used for the current collector, for example, a sintering temperature is preferably lower than 1083° C. that is the melting point of copper or lower, and more preferably in a range from 700 to 850° C.

The anode may also be formed by the method described below. After forming the coated film on the current collector, the coated film and the current collector are dipped together in a solution that contains a carbonaceous material or an organic material that turns to carbonaceous material through the heat treatment, or the current collector is coated with the solution, and the film is formed by drying to remove the solvent. Then the film and the current collector are sintered in a non-oxidizing atmosphere so that the carbonaceous material covers the current collector. This prevents the contact between the current collector and the electrolytic solution, thereby suppressing the dissolution of the current collector metal and improving the storage stability of the battery.

The coating solution is applied to an organic film such as polyester film, instead of the current collector, and is dried then the coated film is sintered in a non-oxidizing atmosphere after being separated from the organic material film or without separating. A sintering temperature is preferably in such a range as silicon compounds such as SiC are not formed and silicon is not molten. The sintering process is carried out for a period of 0.1 hours or longer at a temperature in a range from 400 to 1400° C., more preferably from 800 to 1200° C., thereby to obtain the sintered material. The sintered material may be placed on the current collector and sintered at such a temperature, as the current collector does not melt, thereby to integrate with the current collector.

The anode and the current collector may be integrated by adding silicon powder and a carbonaceous material or an organic material that changes to carbonaceous material through heat treatment to the binder and the solvent, without subjecting to the heat treatment, thereby preparing the coating solution, with the coating solution being applied to the current collector and heat-treated in a non-oxidizing atmosphere in such a temperature range as the current collector does not melt, thereby sintering the anode and the current collector into a single body. In this case, the coating solution may be applied to an organic film, instead of the current collector, then dried and separated from the organic film and placed on the current collector to be fired thereby forming a sintered material which is integrated with the current collector.

In the method of the present invention, although there is no limitation to the method of forming the coated film on the current collector, it is preferable to apply the coating solution containing the anode material and the binder, in order to maintain the uniformity of the coating solution. The coating solution may also be applied directly to the current collector to form the coated film. Alternatively, the coated film formed by applying the coating solution to other base material is peeled off and attached to the current collector. When attaching the peeled coated film to the current collector, it is desirable to form the coated film by applying the coating solution to such a base material that allows it to easily peel off the coated film. The base material may be selected according to the compatibility with the solvent, the binder and the anode active material contained in the coating solution. For this purpose, a film made of polyethylene terephthalate (PET) and treated with a release agent is preferably used. The coated film that has been peeled off may be attached to the current collector simply by pressing or by means of an adhesive.

In order to mix the anode material and the binder uniformly, it is desirable to mix the anode material with a solution wherein the binder has been dissolved or dispersed in advance. In the preparation of the solution or dispersion of the binder, any solvent or water may be used according to the solubility and dispersing property of the binder, polymer and plasticizer that are added, solubility and dispersing property of the anode material and the drying rate of the coated film. A dispersant may also be added in order to improve the dispersing property of the anode material in the coating solution.

When the coating solution is prepared by wet mixing of the anode material and the binder, a common apparatus used in preparing coating solutions may be used such as roll mill, ball mill, attritor, sand mill, disperser, jet mill and ultrasonic disperser.

When applying the coating solution to the current collector or other base material, various coating methods may be employed such as gravure coating, dye coating, dipping, blade coating, spinning and spray coating.

While hot air dryer is desirable in view of the drying efficiency for drying the applied coating solution to form the coated film, the present invention is not limited to this method and various other drying methods may be employed.

In order to improve the uniformity and density of the coated film, it is desirable to compress the coated film formed on the current collector with, for example, a roll press or a flat plate press, as required.

Now the present invention will be described in more detail by way of preferred embodiments.

Embodiment 1

A battery according to the first embodiment was made in the following process.
(Formation of anode)

28.5 parts by weight of polycrystalline silicon powder having purity of 99.9% and mean particle size 7 $\mu$m, 7 parts by weight of graphite and 1 part by weight of pitch were uniformly mixed, with a solution made by dissolving 16 parts by weight of phenol-formaldehyde resin (resol type) and 4 parts by weight of polyvinyl butyral resin in 43 parts by weight of N-methyl-2-pyrrolidone (NMP) was added to the mixture, and the solution was charged into a vibration mill to obtain a uniform coating solution. This coating solution was applied to a copper foil having a thickness of 35 $\mu$m using an applicator (gap width 500 $\mu$m), and was dried at 80° C. for 30 minutes. The coated film was punched in a shape of disk 2 cm in diameter, that was pressed with a pressure of $1.5 \times 10^8$ Pa with a flat plate press and fired in a nitrogen atmosphere at a temperature of 800° C. for three hours, thereby forming a anode.
(Formation of cathode)

Lithium carbonate and cobalt carbonate were weighed in a molar ratio of 1: 1, and were uniformly mixed in a ball mill using isopropyl alcohol as the solvent. The mixture was dried and fired at 800° C. for one hour in the air. The fired powder was crushed and formed into pellets 2 cm in diameter and 0.3 mm thick under a forming pressure of $1.3 \times 10^8$ Pa. The pellets were fired at 800° C. for ten hours thereby obtaining a cathode.
(Fabrication of battery)

A porous film made of polyethylene was interposed as a separator between the anode and the cathode, and the electrolytic solution was made by adding 1 mole/L of $LiPF_6$ to a mixture of ethylene carbonate and dimethyl carbonate in a volume proportion of 1: 1, thereby making a coin type battery.

The battery made as described above will be called sample No. 1. Sample No. 2 is a battery made in the method described above wherein the 16 parts by weight of phenol-formaldehyde resin is replaced by 22 parts by weight of xylene resin. Sample No. 3 is a battery made in the method described above wherein graphite is not mixed in the anode material, while the anode film is peeled off the copper foil and fired at 1100° C. Sample No. 4 is a battery made in the method described above wherein 9.5 parts by weight of silicon powder is used. Sample No. 5 is a battery made in the method described above wherein graphite is not mixed in the anode material. Sample No. 6 is a battery made by using a coated film formed as follows for the anode: 50 parts by weight of polycrystalline silicon powder having purity of 99.9% and mean particle size of 7 μm and 5 parts by weight of graphite were uniformly mixed, with a solution made by dissolving 5 parts by weight of polyvinylidene fluoride resin in 50 parts by weight of NMP was added to the mixture, and the solution was. charged into a vibration mill to obtain a uniform coating solution. This coating solution was applied to a copper foil having a thickness of 35 μm by means of an applicator (gap width 500 μm), and was dried at 80° C. for 30 minutes. The coated film was punched in a shape of disk 2 cm in diameter, that was pressed with a pressure of $1.5 \times 10^8$ Pa with a flat plate press, thereby making a anode without firing.

The batteries fabricated as described above were left to stand at the room temperature for a whole day. Then the batteries were subjected to one cycle of charge and discharge (charging for 15 hours, discharging cut off voltage 2.5 V) with current of 2 mA, and one cycle of charge and discharge (charging for 6 hours, discharging cut off_voltage 2.5 V) with current of 4 mA. Then the batteries were subjected to cycle test (charging with constant current, constant voltage with 12 mA, 4.05 V for 3 hours, discharging with constant current of 8 mA, discharging cut off voltage 2.5 V). The results of the cycle test and the electrical conductivity of the anodes are shown in Table 1.

The electrical conductivity of the anode was measured by four-terminal method as described below. A rectangular anode is placed on a slide glass. Four copper wires serving as terminals were bonded to the anode by means of an electrically conductive paste, in a state of being disposed on a pair of opposing sides of the anode in parallel to each other at a distance sufficiently large compared to the thickness of the anode and being stretched tightly. Ends of the four copper wires were fixed on the slide glass with the electrically conductive paste. Outer two of the four copper wires were connected as current supply terminals to a current source, and inner two wires were connected as voltage measuring terminals to a voltmeter.

Then the voltage was measured by changing the magnitude of current and the direction of current flow. Electrical resistance (R) was determined from the gradient of the line of voltage-current property, and the electrical conductivity of the anode was calculated as follows.

Electrical conductivity=[L/(R×A)]

In the above equation, L is the distance between the two voltage measuring terminals, and A is the cross sectional area of the sintered material in a plane perpendicular to the direction of current.

TABLE 1

| Sample No. | Silicon content in anode (% by weight) | Electrical conductivity (S/cm) | Discharge capacity after 1 cycle (mAh) | Retention of capacity after 10 cycles (%) |
|---|---|---|---|---|
| 1 | 75 | 1.6 | 26 | 96 |
| 2 | 75 | 3.3 | 26 | 98 |
| 3 | 85 | 1 | 26 | 90 |
| 4 | 50 | 0 | 26 | 92 |
| 5 | 85 | 0.3 | 24 | 80 |
| 6 | 80 | <0.1 | 20 | 10 |

As will be clear from Table 1, satisfactory cycle properties are obtained by using the anode having electrical conductivity of 1 S/cm or higher. The results of sample No.3 also shows that satisfactory cycle properties can be obtained while maintaining high electrical conductivity even when highly electrically conductive graphite is not used, by raising the sintering temperature. Also high capacity was obtained by using silicon as the anode active material.

Anodes formed similarly to sample No.3 except for setting the sintering temperature to 1500° C. showed gray color after firing. Thus it was confirmed that silicon compound was formed in the anode. A battery made by using this anode showed a high electrical resistance and could not be charged.

Embodiment 2

A battery according to the second embodiment was made in the following procedure.
(Formation of anode)

70g of polycrystalline silicon powder having purity of 99.9% and mean particle size 7 μm was put into 100 g of toluene solution containing 3% of pitch and dried. The dried material was fired at 1100° C. for three hours in nitrogen atmosphere, thereby to cover the surface of the silicon powder with carbon film. An anode was formed in the same manner as in the case of sample No.6 except for using the carbon-covered silicon powder in place of the polycrystalline silicon powder of sample No.6 of the first embodiment.
(Formation of cathode)

A cathode was formed in the same manner in the first embodiment.
(Fabrication of battery)

A battery was made in the same manner as in the first embodiment.

The battery made as described above will be called sample No.7. Sample No.8 is a battery made by using the anode formed by the method described above. That is, an anode formed similarly to sample No.7 was dipped into toluene solution containing 3% of pitch and dried. The dried material was fired at 850° C. for three hours in nitrogen atmosphere. Thus the anode having a thickness of 150 μm and density of 1.4 g/cm³ with a copper foil that carries the active material and is covered by the carbonaceous material was formed.

The batteries made as described above were, after being left for one day, subjected to one cycle of charging and discharging with constant current of 3 mA between charging cut off voltage of 4.1 V and discharging cut off voltage of 2.0 V. Then after carrying out charging with constant current, constant voltage with 10 mA to the charging cut off voltage of 4.1 V and discharging with constant current of 8 mA to the discharging cut off voltage of 2.0 V, the batteries were stored in the state of discharged at the room temperature for 30 days. The retention (%) of capacity is defined as the ratio of battery capacity after 30 days of storage to the initial battery capacity measured at the constant current of 8 mA. In order to investigate the storage stability under the state of overdischarge, charge and discharge voltages were changed from 4.1 V and 2.5 V to 4.1 V and 2.0 V, by decreasing the discharging cut off voltage.

In order to determine whether the silicon particles in the anode were covered by the carbonaceous material, elements on the surface of the anode were analyzed using X-ray photoelectron spectroscopy (ESCA). Also to determine whether the electrolytic solution was decomposed or not, the electrolytic solution was analyzed by gas chromatograph mass spectrometer (GC-MS) after immersing the anode in the electrolytic solution for a predetermined period of time.

The results of measurement are shown in Table 2.

TABLE 2

| Sample No. | Presence or absence of coating layer on anode Si surface | Presence or absence of reaction product with electrolytic solution | Initial discharge capacity at 8 mA discharge current (mAh) | Retention of capacity after storage for 30 days (%) |
|---|---|---|---|---|
| 6 | None | Yes | 20 | 50 |
| 7 | Present | No | 24 | 85 |
| 8 | Present | No | 24 | 90 |

From the analysis with the ESCA, it was verified that silicon particles in samples No.7 and No.8 are not exposed on the surface of the anode, but covered with the carbonaceous material. Sample No.7 showed significantly improved initial capacity and capacity retention over sample No.6. In sample No.8, the retention of capacity was further improved by covering the current collector with the carbonaceous material.

In the analysis with GC-MS of the electrolytic solution wherein the electrode of sample No.6 was immersed, difluoromethyl phosphate generated by the reaction of dimethyl carbonate used as the solvent and $LiPF_6$ of the electrolyte on the surface of silicon was detected. Further, ESCA analysis of the electrode that was dipped in the electrolytic solution showed the presence of a compound containing silicon and fluorine, although molecular structure thereof is not known, and it was confirmed that the silicon particles react directly with the electrolytic solution.

Embodiment 3

A battery according to the third embodiment was made in the following procedure.
(Formation of anode)
An anode was formed in the same manner as in case of sample No.1 of the first embodiment.
(Preparation of electrolytic solution) 1 mole/L of $LiPF_6$ was dissolved in a solvent made by mixing ethylene carbonate and dimethyl carbonate with proportion of 1: 1 (by volume), to prepare seven types of electrolytic solution containing hydrogen fluoride in concentrations of 1000 (sample No. 13), 750 (No. 14), 500 (No. 15), 250 (No. 9), 100 (No. 10), 30 (No. 11) and 3 $\mu g/g$ (No. 12).
(Formation of cathode)
A cathode was formed in the same manner as in the first embodiment.
(Fabrication of battery)
Batteries were fabricated in the same manner as in the first embodiment by using the anode, the seven types of electrolytic solution and the cathode that were made as described above. Porous polyethylene film (manufactured by Asahi Chemical Industry Co., Ltd.) having a thickness of 25 $\mu m$ was used as the separator.

The batteries thus obtained were subjected to cycle test (charging with constant current, constant voltage with 12 mA, 4.05 V for 3 hours, discharge with constant current of 8 mA, cut off voltage 2.5 V). The results of the cycle test are shown in Table 3.

TABLE 3

| Sample No. | 9 | 10 | 11 | 12 | 13 | 14 | 15 |
|---|---|---|---|---|---|---|---|
| Concentration of hydrogen fluoride ($\mu g/g$) | 250 | 100 | 30 | 3 | 1000 | 750 | 500 |
| Initial discharge capacity (mAh) | 24 | 25 | 25 | 25 | 20 | 22 | 23 |
| 50th discharge capacity (mAh) | 18 | 20 | 21 | 22 | 8 | 11 | 14 |
| Discharge capacity ratio (after 50th/initial) (%) | 75 | 80 | 85 | 90 | 40 | 50 | 60 |

Samples No. 9 through No. 12 where Hydrogen fluoride concentration in the electrolytic solution was kept within 250 $\mu g/g$ showed better cycle property than samples No. 13 through No. 15.

Embodiment 4

Batteries according to the fourth embodiment were made in the following procedure.
(Formation of cathode)
Cathodes having a thickness of 0.15 mm (No. 16), 0.4 mm (No. 17), 0.6 mm (No. 18) and 0.75 mm (No. 19) were formed in the same manner as in the first embodiment, except for the thickness.
(Formation of anode)
Anodes were formed in the same manner as in the first embodiment except for the applicator gap being set to 1000 $\mu m$.
(Fabrication of battery)
Batteries were fabricated in the same manner as in the first embodiment.

The batteries Nos. 16, 17, 18, 19 showed incorporation of lithium equivalent to 200 mAh, 530 mAh, 800 mAh and 1000 mAh per 1 g of anode silicon when charged with the maximum voltage of 4.05 V.

The coin type batteries made by assembling the components described above were left to stand at the room temperature for a whole day. Then the batteries were subjected to cycle test (charging with constant current, constant voltage with 12 mA, 4.05 V for 3 hours, discharge with constant current of 8 mA, discharge end voltage 2.5 V). The retention of capacity at the 50th cycle was calculated by dividing the discharge capacity at the 50th cycle by the discharge capacity at the 1st cycle. The results of the cycle test are shown in Table 4.

TABLE 4

| Sample No. | Capacity per 1 g of silicon (mAh/g) | Retention of capacity after 50 cycles (%) |
|---|---|---|
| 16 | 200 | 95 |
| 17 | 530 | 90 |
| 18 | 800 | 85 |
| 19 | 1000 | 70 |

As shown above, samples No. 16 through No. 18 that showed incorporation of lithium equivalent to 200 mAh through 800 mAh per 1 g of anode silicon when fully charged demonstrated better cycle property than sample No. 19.

Embodiment 5

Batteries according to the fifth embodiment were made in the following process.

(Formation of anode)

80 parts by weight of silicon powder (mean particle size: 1 μm, purity: 99%, manufactured by Kojundo Kagaku Kenkyujo K.K.) and 20 parts by weight of a mixed powder of graphite and pitch resin (90 parts by weight of graphite and 10 parts by weight of pitch resin, manufactured by Osaka Kasei K.K.) were mixed and, after firing at 1100° C. in a nitrogen atmosphere for three hours, crushed for five minutes in a vibration mill to obtain the raw powder.

30 parts by weight of the raw powder and 80 parts by weight of NMP solution (10%) of polyvinylidene fluoride resin used as binder were mixed for ten minutes in a vibration mill to obtain a coating solution.

The coating solution was applied to a copper foil (30 μm thick) using an applicator (gap width 500 μm), and was dried at 80° C. for 30 minutes. The coated film was punched in a shape of disk 2 cm in diameter, that was pressed with a pressure of $1.5 \times 10^8$ Pa using a flat plate press.

The coated film was fired at 800° C. in nitrogen atmosphere for 3 hours, thereby making the anode.

(Analysis of binder)

Thermogravimetry of polyvinylidene fluoride resin (manufactured by Kureha Chemical Industry Co., Ltd.) of the binder in a nitrogen atmosphere showed weight retention of 25% at 800° C.

(Formation of cathode)

Cathodes were formed in the same manner as in the first embodiment.

(Fabrication of battery)

Batteries were made in the same manner as in the first embodiment.

The battery made in the process described above will be called sample No. 20. Sample No. 21 is a battery made similarly to sample No. 20, except for using polyacrylonitrile (reagent having a molecular weight of 150000, manufactured by Poly-Science K.K.) as the binder and adding a solution, that was made by diluting 6 parts by weight of polyacrylonitrile and 2 parts by weight of polyvinyl butyral resin (manufactured by Sekisui Chemical Co., Ltd.) in 60 parts by weight of NMP, to 32 parts by weight of the raw powder. The retention of weight at 800° C. was 35%.

Sample No. 22 is a battery made similarly to sample No. 20, except for using phenol-formaldehyde resin (resol type, viscosity 50 Pa·s) as the binder and adding a solution made by dissolving 7.5 parts by weight of phenol-formaldehyde resin and 5 parts by weight of polyvinyl butyral resin used in the example 18 in 50 parts by weight of ethanol to 37.5 parts by weight of the raw powder. The retention of weight at 800° C. was 60%.

Sample No. 23 is a battery made in the same manner as in the case of sample No. 20, except for using gelatin (made by Nitta Gelatin K.K.) as the binder and adding a solution made by dissolving 12.5 parts by weight of gelatin and 2.5 parts by weight of glycerin (reagent manufactured by Wako Pure Chemicals Co., Ltd.) in 50 parts by weight of water to 35 parts by weight of raw powder. The retention of weight at 800° C. was 20%.

Sample No. 24 is a battery made similarly to sample No. 20, except for using granulated sugar (manufactured by Taito Co., Ltd.) as the binder and adding a solution made by dissolving 11 parts by weight of granulated sugar in 44 parts by weight of water together with 35 parts by weight of an aqueous polyethyleneimine solution (manufactured by Nippon Shokubai K.K.) to 35 parts by weight of raw powder. The retention of weight at 800° C. was 17%.

After aging for 36 hours at the room temperature, the batteries were subjected to a cycle test (charging with constant current, constant voltage with 12 mA, 4.05 V for 3 hours, discharging with constant current of 8 mA, discharging cut off voltage 2.5 V). The results of the test are shown in Table 5.

TABLE 5

| Sample No. | Initial discharge capacity (mAh) | Discharge capacity after 30 cycles mAh) |
|---|---|---|
| 20 | 25 | 20 |
| 21 | 26 | 23 |
| 22 | 26 | 23 |
| 23 | 26 | 23 |
| 24 | 26 | 22 |

The binder that is turned into non-graphitizable carbon by the heat treatment and shows weight retention of 5% or more provides high capacity and good cycle properties.

In Raman shift analysis of the anode used in sample No. 20, a peak of intensity 5000 cps was observed at wave number 525 $cm^{-1}$, but no peaks having intensity not less than 50 cps were observed at wave numbers 770 $cm^{-1}$ and 940 $cm^{-1}$. Consequently, peak intensities that are attributed to SiC are not higher than 0.01 with respect to the peak intensity that is attributed to Si, and sample No. 20 did not substantially contain SiC.

What is claimed is:

1. A lithium secondary battery, comprising a cathode, an anode and lithium ion conductive electrolytic solution, each electrode containing an active material capable of incorporating and releasing lithium ions, wherein the anode comprises a sintered material which contains 50 to 99% by weight of silicon and 1 to 50% by weight of a carbonaceous material, and the sintered material has an electrical conductivity not less than 1 S/cm, and wherein the electrolytic solution contains fluorine-containing lithium salt, and the concentration of hydrogen fluoride in the electrolytic solution is not more than 250 μg/g.

2. The lithium secondary battery of claim 1, wherein silicon contained in the sintered material is in the form of particles, and the particles are covered with a carbonaceous material.

3. The lithium secondary battery of claim 1, wherein an amount of lithium which is equivalent to 200 to 800 mAh per 1 g of silicon is incorporated in the anode when fully charged.

4. The lithium secondary battery of claim 1, wherein the concentration of hydrogen fluoride in the electrolytic solution is not more than 150μg/g.

5. The lithium secondary battery of claim 4, wherein the concentration of hydrogen fluoride in the electrolytic solution is not more than 100 μg/g.

6. The lithium secondary battery of claim 1, wherein said sintered material of said anode contains not less than 5% by weight of binder used to form said anode.

7. The lithium secondary battery of claim 6, wherein said sintered material of said anode contains not less than 10% by weight of binder used to form said anode.

8. The lithium secondary battery of claim 1, wherein said sintered material of said anode contains 70% by weight or more or said silicon.

9. The lithium secondary battery of claim 2, wherein said silicon particles have a particle size of 0.5 to 100 μm.

10. The lithium secondary battery of claim 1, wherein said cathode is made of a lithium-containing metal oxide containing cobalt.

11. The lithium secondary battery of claim 1, wherein said cathode is made of a lithium-containing metal oxide containing manganese.

12. The lithium secondary battery of claim 1, wherein said cathode is made of a lithium-containing metal oxide containing nickel.

13. The lithium secondary battery of claim 1, wherein said cathode is made of $V_2O_5$ or $TiS_2$.

14. The lithium secondary battery of claim 1, wherein the sintered material of said anode contains substantially no SiC.

15. The lithium secondary battery of claim 1, wherein the sintered material of said anode has a structure such that a dispersed phase of silicon exists in a continuous phase of the carbonaceous material.

16. The lithium secondary battery of claim 2, wherein said silicon particles have a purity of 99.9% and a size of 7 $\mu$m.

17. A process for producing a lithium secondary battery, which comprises the steps of providing a cathode and an anode, each electrode containing an active material capable of incorporating and releasing lithium ions, and an electrolytic solution; the anode being formed by the steps of:
   a) forming a coated film consisting of silicon and a binder that forms non-graphitizable carbon through heat treatment on a current collector; and
   b) sintering the coated film in a non-oxidizing atmosphere, thereby integrating a sintered material of the coated film with the current collector;
   and wherein said electrolytic solution contains fluorine-containing lithium salt, wherein the concentration of hydrogen fluoride in the electrolytic solution is not more than 250 $\mu$g/g.

* * * * *

UNITED STATES PATENT AND TRADEMARK OFFICE
CERTIFICATE OF CORRECTION

PATENT NO.   : 6,413,672 B1
DATED        : July 2, 2002
INVENTOR(S)  : Suzuki et al.

It is certified that error appears in the above-identified patent and that said Letters Patent is hereby corrected as shown below:

Title page,
Item [75], Inventors, "Miharu Kuskabe, legal representative" should read -- Miharu Kusakabe, legal representative --.

Column 3,
Line 27, "ore" should read -- more --.

Column 4,
Lines 49-50, "substance of simple silicon" should read -- simple substance of silicon --.

Column 9,
Line 34, "cut off__voltage" should read -- cut off voltage --.

Column 10,
Table 1, Sample No. 4, Electrical conductivity (S/cm), "0" should read -- 10 --.

Column 12,
Line 20, "250 $\mu$ gig" should read -- 250 $\mu$ g/g --.

Signed and Sealed this

Eighth Day of April, 2003

JAMES E. ROGAN
*Director of the United States Patent and Trademark Office*